March 10, 1925.
J. E. SULLIVAN ET AL
1,528,898
TOOL FEED MECHANISM
Filed April 4, 1922
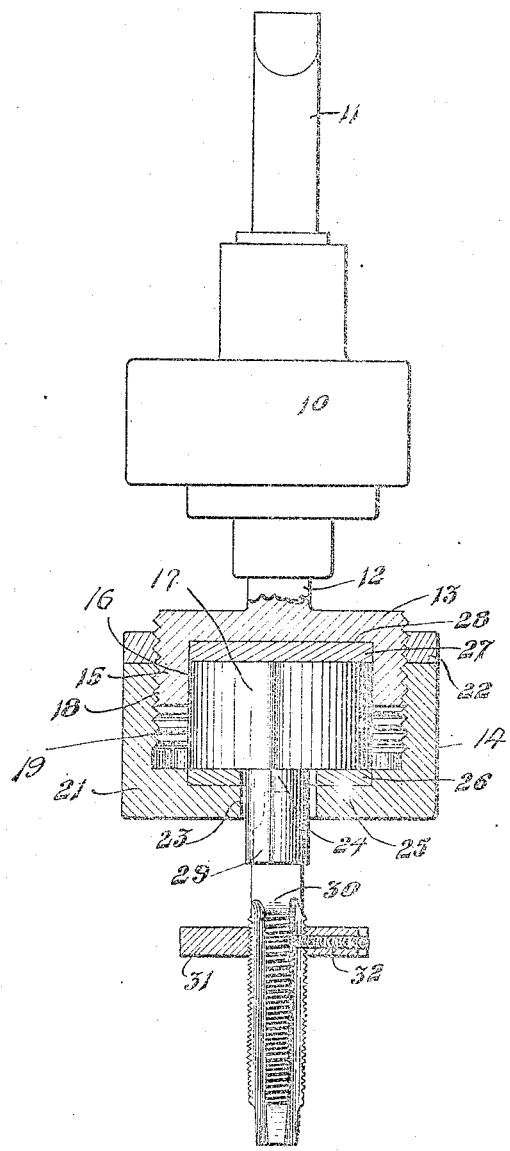
WITNESSES:
J.E. Sullivan
& H.R. Beck
INVENTOR
BY D.C. Davis
ATTORNEY Patented Mar. 10, 1925.

1,528,898

UNITED STATES PATENT OFFICE.

JOSEPH E. SULLIVAN AND HENRY R. BECK, OF MOORE, PENNSYLVANIA, ASSIGNORS TO WESTINGHOUSE ELECTRIC AND MANUFACTURING COMPANY, A CORPORATION OF PENNSYLVANIA.

TOOL-FEED MECHANISM.

Application filed April 4, 1922. Serial No. 549,543.

*To all whom it may concern:*

Be it known that we, JOSEPH E. SULLIVAN and HENRY R. BECK, citizens of the United States, and residents of Moore, in the county of Delaware and State of Pennsylvania, have invented a new and useful Improvement in Tool-Feed Mechanism, of which the following is a specification.

Our invention relates to tool feed mechanism, and more particularly to mechanism for the operation of rotary tools such as drills, taps, reamers, etc., and it has for an obect to provide apparatus of the character designated, which shall serve to control the feeding of such tools within close limits and with a high degree of precision.

In the accompanying drawing, the single figure is a view, partially in section and partially in elevation, of apparatus embodying our invention.

In operations with machine tools of the nature of drills, reamers, taps, etc., which involve the formation or subsequent modification of holes, it is frequently of importance that the operation be concluded at a very definite depth of cut, either for reasons of mechanical precision, or for economy of time and effort. An example of such an operation is the tapping of threads in the holes of the tube plates of steam condensers. In this case the threads must be accurately cut to the same depth in all the holes, in order to preserve a uniform clearance between the tube ends and the packing ferrules. If this clearance is too great, contraction of the tube will partially withdraw it from the packing, tending to cause leaks. If too small, expansion of the tube may cause its end to strike the ferrule and strip the threads thereon.

With the above and other objects in view we have devised an apparatus in which the rotation of a tool may be stopped when its operation has been conducted to a predetermined proper depth. Still other structural features of our invention will be apparent from the sub-joined description.

In the drawing, 10 indicates a reversing chuck, such as is commonly used in connection with the operation of machine tools of the type to which our invention relates. The function of the chuck 10 is to carry the cutting tool, and to transmit thereto power from the driving means with a given direction of rotation, which direction of rotation is automatically reversed after a predetermined travel of the tool, as is well understood in the art to which our invention relates. The chuck 10 is provided with a shank 11 adapted to be driven by a drill press or other suitable source of power (not shown). From the lower end of the chuck 10 protrudes the driven shank 12 which is rigidly connected to the driving head 13 of a clutch mechanism 14.

The driving head 13 is provided with an annular, depending flange 15 forming a cylindrical recess 16 adapted to receive the head 17 of the driven member of the clutch 14. The cylindrical exterior of the flange 15 is provided with threads 18 which cooperate with threads 19 on the interior of a hollow adjusting nut 21. A lock nut 22 is provided to prevent turning of the adjusting nut 21. The end of the adjusting nut 21 is provided with an axially disposed circular opening 23, through which projects the stem portion 24 of the driven member of the clutch. A circular recess 25 is also provided interiorly of the nut 21 and surrounding the opening 23, adapted to receive and provide a seat for an annular friction washer or disk 26, which bears also against the lower face of the head 17 of the driven member. A friction disk 27 is also placed between the upper face of the head 17 of the driven member and the end face 28 of the recess 16 of the driving member. It is readily understood that by tightening the adjusting nut 21 the friction disks 26 and 27 are compressed between the faces of the head 17 and their respective engagements 25 and 28.

The stem portion 24 of the driven member is provided with an ordinary tool receiving socket 29, which carries the cutting tool 30, here illustrated as a standard tap. The tool 30 is provided with a stop collar 31, adustably secured thereon in any convenient manner, as by the set screw 32.

As applied to the tapping of condenser tube plates, the operation of our device is as follows.

The stop collar 31 is adjusted on the tap 30 that the distance from its lower face to the first cutting edge of the tap is just equal to the depth to which it is desired to thread the tube plate. The tap is then started in its hole in the usual manner and the threading proceeds to the predetermined depth, when the lower face of the collar 31 strikes the tube plate, stopping both rotation and axial feed of the tap 30. The reversing chuck 10, however, continues to operate in a forward direction for one or more revolutions, depending on the accuracy with which it has been set and the sensitiveness of its reversing mechanism. Such forward motion of the chuck 10, and the associated driving head 13, while the tap 30 and consequently the driven head 17 are stationary, is permitted by virtue of the friction disks 26 and 27, which slip under the excessive torque produced. When the reversing mechanism of the chuck 10 comes into play, direction of rotation of the head 13 is reversed, the friction disks 25 and 27 transmit the reversed torque to the driven head 17 and the tap is backed out of its hole.

It will be apparent that our invention supplies a device by the use of which the greatest accuracy may be obtained, not only in the cutting of tapped threads to a predetermined depth, but in any machine operation involving the boring, drilling or other manipulation of holes.

While we have shown our invention in but one form, it will be obvious to those skilled in the art that it is not so limited, but is susceptible of various other changes and modifications, without departing from the spirit thereof, and we desire, therefore, that only such limitations shall be placed thereupon as are imposed by the prior art or as are specifically set forth in the appended claims.

What we claim is:

1. In a tool feeding mechanism, a clutch adapted to slip upon a certain maximum torque, driving means therefor, a cutting tool driven thereby, and means comprising a stop collar adjustably secured to the cutting tool whereby rotation thereof is arrested at a predetermined depth of cut.

2. In a tap feeding mechanism, a clutch adapted to slip upon a certain, maximum torque, means driving said clutch, a tap driven by the clutch, and a stop collar adapted to thread upon said tap and to be secured thereon at any given distance, whereby rotation of the tap is arrested at a predetermined depth of cut.

3. In combination in a rotary tool feeding mechanism, a cutting tool, means for arresting rotation thereof at a predetermined depth of cut comprising a stop member secured to the tool and a clutch driving said tool and adapted to slip upon cessation of rotation of the tool.

4. A tap feeding mechanism comprising a reversing chuck, a clutch driven thereby adapted to slip at excess torque, and a stop collar associated with a tap driven by said clutch whereby excess torque is provided at a predetermined depth of cut.

In testimony whereof, we have hereunto subscribed our names this 29th day of March, 1922.

JOSEPH E. SULLIVAN.
HENRY R. BECK.